(12) United States Patent
Skubic

(10) Patent No.: US 6,580,024 B2
(45) Date of Patent: Jun. 17, 2003

(54) ELECTRONIC STROBE TUNING AID

(75) Inventor: Michael J. Skubic, Orland Park, IL (US)

(73) Assignee: Peterson Electro-Musical Products, Inc., Alsip, IL (US)

( * ) Notice: Subject to any disclaimer, the term of this patent is extended or adjusted under 35 U.S.C. 154(b) by 72 days.

(21) Appl. No.: 10/041,747

(22) Filed: Jan. 10, 2002

(65) Prior Publication Data

US 2002/0088333 A1 Jul. 11, 2002

Related U.S. Application Data

(60) Provisional application No. 60/260,639, filed on Jan. 11, 2001.

(51) Int. Cl.[7] .................. G09B 15/00; G09B 15/02
(52) U.S. Cl. ................. 84/477 R; 84/616; 84/454
(58) Field of Search .................. 84/615, 616, 653, 84/654, 454–458, 477 R

(56) References Cited

U.S. PATENT DOCUMENTS

| | | |
|---|---|---|
| 3,901,120 A | 8/1975 | Youngquist |
| 4,457,203 A | 7/1984 | Schoenberg et al. |
| 4,589,324 A | 5/1986 | Aronstein |
| 4,796,509 A | 1/1989 | Mizuguchi et al. |
| 5,773,737 A * | 6/1998 | Reyburn ............ 84/454 |
| 5,777,248 A | 7/1998 | Campbell |
| 5,814,748 A * | 9/1998 | Reyburn ............ 84/454 |
| 5,877,443 A | 3/1999 | Arends et al. |

* cited by examiner

Primary Examiner—Marlon T. Fletcher

(57) ABSTRACT

A musical instrument tuning and intonation aid employs a novel concept and method, which closely approximates a desirable mechanical stroboscopic effect—but without mechanical moving parts. A suitable image pattern is displayed on an electronically controlled, visual display screen of any available type (Liquid Crystal Display, Organic LED Display, Electro-Luminescent Display, Cathode Ray Tube display, etc.) in direct and immediate response to the detection of a unique phase of the fundamental pitch periods in arbitrary acoustic or electrical signals. The displaced position of the pattern at these instants is determined by a pre-calculated reference frequency.

25 Claims, 3 Drawing Sheets

ELECTRONIC STROBE TUNING AID

PRIORITY CLAIM UNDER 35 USC 119(e)

This application claims priority, under 35 USC 119(e), on U.S. Provisional Application No. 60/260,639, filed Jan. 11, 2001, which is hereby incorporated by reference.

BACKGROUND OF THE INVENTION

1. Field of the Invention

The present invention relates in general to a method and apparatus for providing a visual indication of the difference in frequency between that of an input signal or waveform and a reference frequency. Although not limited thereto, the invention is particularly suited for use as a strobe tuning aid wherein the difference in pitch between a detected musical note and a reference frequency can be visually indicated.

2. Description of the Background Art

U.S. Pat. No. 3,901,120 by Youngquist and U.S. Pat. No. 5,777,248 by Campbell, among others, describe dynamic fundamental frequency (musical "pitch") comparison systems that respond in essentially instantaneous ways to electrical or acoustic input. However, they are limited in the relatively discrete and physically large visual elements required in their implementations. Thus, when the process inherent to these systems requires a change as to which elements are to be activated (i.e., pattern "movement"), there is necessarily either a delay introduced (during such time as the process yields intermediate values of phase in lit and extinguished visual elements) or a period of visually noticeable blurring in which adjacent visual elements are lit at less than full duration (and/or intensity) in proportion to the intermediate phases of frequency differences between the "reference frequency" and the input "pitch". Since the human eye is not nearly as discerning in evaluating intensity variations in said visual elements as it is in detecting slight movement of highly contrasting visual boundaries, such prior systems are not particularly effective in representing small discrepancies between reference frequency and input "pitch". Said delays or difficulties in evaluating pattern "movement" lead to various frustrations for users such as limiting the effective resolution of the devices and increasing the undesirable tendency to "over-shoot" the target reference frequency when adjusting the input "pitch".

Similarly, U.S. Pat. No. 4,457,203 by Schoenberg, et al. and U.S. Pat. No. 4,589,324 by Aronstein disclose dynamic displays for automatic sound signal analyzing equipment that display the closest recognized musical note to that being played or sung by a musician, whether the note is sharp or flat or in tune and if sharp or flat, the extent to which it is sharp or flat by means of a strobe-like "moving" bar pattern. The rate of change of the "moving" bar pattern occurs as a result of an analysis of the input "pitch" or "fundamental period", and thus requires a certain amount of time to perform the analysis before the bar pattern can be altered in response to said input "pitch". Moreover, in a similar manner to Youngquist and Campbell, the image elements—in this case, rectangular bars—are relatively large, discrete areas which are sequenced. Consequently, such an implementation also suffers from the same indeterminacy in reading small discrepancies between the reference frequency and input "pitch"—the very condition under which the user most needs precise and instantaneous visual indication from such a device.

SUMMARY OF THE INVENTION

The present invention employs an improved technique to indicate the relative "pitch" of an input that is more responsive than the techniques described in the prior art. The primary differentiating factor between the present invention and the devices described by Schoenberg, et al and by Aronstein is that the rate of change in the displayed image pattern in the subject system is not a result of any analytical calculation, interpolation, or average of the input "fundamental period" or "pitch" as it is in the aforementioned prior art (and typical of musical tuners in general). Instead it is the consequence of an always immediate display of an image pattern whose position is determined by a calculation based upon a reference frequency. The advantage is an image that is smoothly varying and nearly instantaneously responsive to a particular phase or portion of the "fundamental period" segments of the input waveform (to the limit of the underlying electronic circuit speed). This response is orders of magnitude faster than the plurality of input "fundamental period" segments or intervals required for the calculations that limit the responsiveness in tuning concepts like that of Schoenberg, et al. and Aronstein.

The present invention differs from and represents an improvement upon Youngquist and others by using reference frequency timing to determine the position of an image pattern on a visual display as opposed to using the relative phase of a reference frequency signal to determine, in part, the actuation of individual light elements (e.g., pixels) to sequentially form an image from discrete elements.

The effect of this improved method is similar to that of a desirable, true stroboscopic effect (such as that described in U.S. Pat. No. 5,877,443 by Arends, et al.) but does not require any expensive and wear-prone mechanically moving elements.

In its broadest sense, the invention comprises a method and apparatus for carrying out the same wherein a first, reference frequency and a second frequency of an input waveform are employed to control a visual display so that one or more image patterns are generated on the display in such a manner that one or more image objects within the patterns appear to move in a direction and at a rate that is indicative of the magnitude and sign of a difference in said frequencies. The reference frequency is employed to determine the position or location on the display at any instant of time where the image patterns or objects are to be generated. More particularly, the reference frequency determines the rate of movement or displacement of the pattern along one or more axes of the display. The second frequency of the input waveform is employed to determine the discrete time periods at which the image patterns or object will be visible. More particularly, a processor or other circuit detects when a unique portion of each of a sequence of fundamental period segments in the input waveform occurs and selectively renders the image patterns visible on the display in response thereto. Thus, each time the unique portion of the fundamental period segment is detected, or after a plurality of such occurrences, the processor or circuit renders visible the image pattern on the visual display at that time and at a position that is dependent on the first frequency. As a result, the image pattern appears to move across the visual display in a direction and at a rate that is dependent on the sign and the magnitude of the difference between the first and second frequency.

Preferably, the first frequency is a known reference that can be selected as desired. The second frequency is preferably that of an external input signal or waveform, whose frequency is to be determined relative to the reference frequency. In a musical strobe tuner application, the reference frequency is generated or represented by an internal electrical signal or software construct that typically corresponds to a reference musical note, and the external input signal or waveform is an electrical signal or waveform that corresponds to a musical note from a musical instrument, that is to be tuned to the reference musical note. It should be understood, however, that the invention could be used to determine the difference between frequencies in any form.

BRIEF DESCRIPTION OF THE DRAWINGS

The features and advantages of the present invention will become apparent from the following detailed description thereof, taken in conjunction with the accompanying drawings, in which:

FIG. 1 is an illustration of a typical display screen configuration utilized in an embodiment of the present invention, specifically, the VS-1 Virtual Strobe Tuner available from Peterson Electro-Musical Products, Inc. in Alsip, Ill. The configuration includes four columns ("bands") of multiple image objects at the left as well as a "parameter" area at the right displaying additional quasi-static information including the musical scale note and octave representing the current reference frequency, pitch or frequency offsets, and so on.

DETAILED DESCRIPTION OF THE PREFERRED EMBODIMENTS

Figure 1:
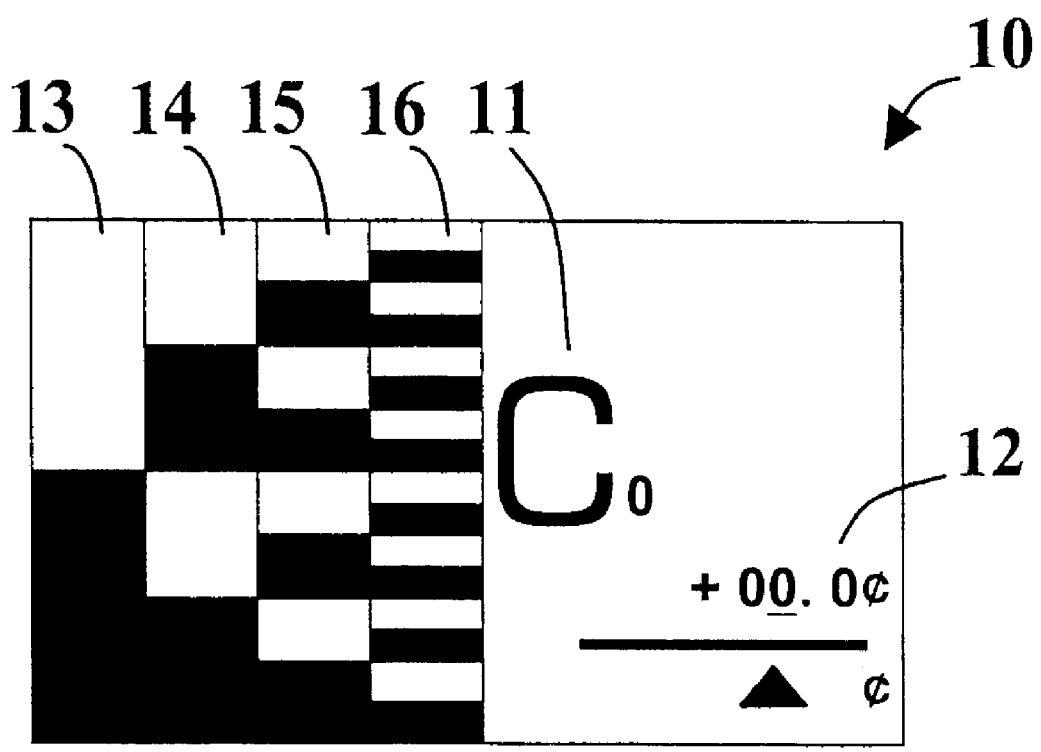

The present invention produces a visually distinct alteration of an image formed upon any of various electronically controlled visual display means current in the art that is proportional to the discrepancy between a known reference frequency and the fundamental frequency or "pitch" of an input signal or waveform. This "distinct alteration" is usually, but not limited to, a shifted or redrawn and displaced version of the initial image. The method used to achieve this alteration with its resultant superior resolution, responsiveness, and accuracy is the novel aspect of this invention. The display image may consist of any pattern of contrasting areas (image objects) including, but not limited to, repeating patterns of dark and light rectangular areas. Visual contrast between these areas may be accomplished through variations in visual parameters such as emitted light intensity, reflected light intensity, emitted color, reflected color, or any combinations thereof. Smaller image objects, which are repeated more densely in the display screen along the dimension in which the repositioning is taking place, permit visual tuning of higher musical octaves of sound. FIG. 1 illustrates an exemplary display screen 10 upon which the right half contains various quasi-static information to the user such as the standard musical note name 11 which most closely represents the current reference frequency and an offset 12 of the actual reference frequency from said standard musical note. The left half of display screen 10 consists of an image pattern containing the image objects that are to be subjected to displacement, in this case, in a vertical direction. Each image object is composed of many—typically dozens or hundreds—of individual pixel elements of such a size and proximity to one another so as to appear continuous to the human eye under normal viewing conditions (as shown). The leftmost column 13 contains one large image object (dark and light rectangular area). The next column 14 to the right contains two smaller image objects. Similarly, the next column 15 to the right contains four even smaller image objects, and the final column 16 contains eight image objects. In this example, for a given reference frequency, column 16 would be effective for assessing an input "pitch" that is four octaves higher (a frequency multiple of eight) than that which would be appropriate for column 13.

Figure 2:
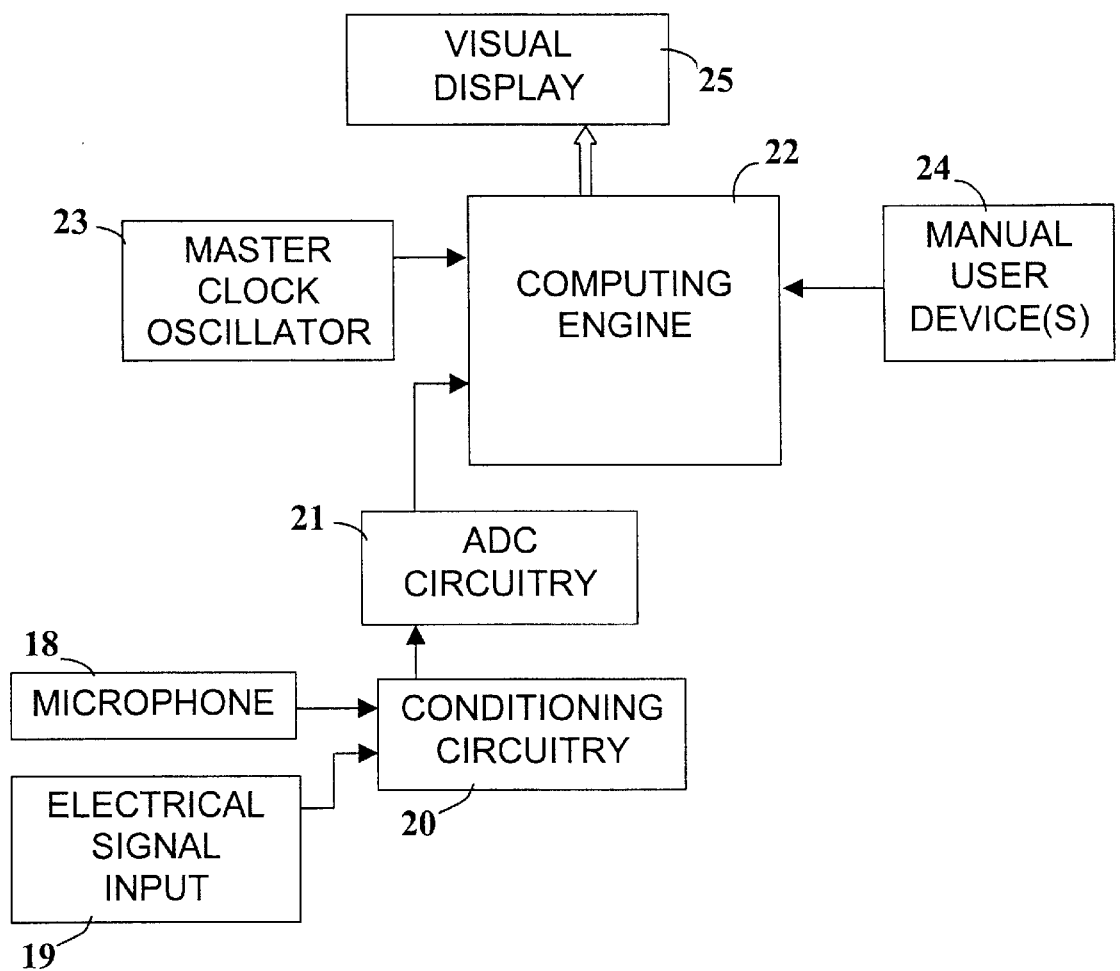
FIG. 2 is a schematic block diagram of basic system elements and interconnections used to create a practical embodiment of the present invention.

As shown in FIG. 2, a first preferred embodiment of the invention contains a means of receiving an external input signal or waveform whose "fundamental frequency" is to be assessed. Said means may include a built-in microphone 18 or other audio-to-electrical transducer for receiving an audio waveform, signal or sound and converting the same to an electrical input waveform or signal, means to receive an electrical signal input 19, or both. The electrical input signal from either the microphone 18 or the electrical signal input 19 may be conditioned with conditioning circuitry 20 for amplification and filtering in generic ways familiar in the art so as to maximize the detection of the fundamental frequency component (musical pitch) within the input signal or waveform. There are many methods and circuit designs current in the art which implement these functions, the details of which are understood by those of skill in the art and are not a subject of this invention. Next, this conditioned input signal or waveform is digitized either explicitly with Analog-to-Digital Converter (ADC) circuitry 21 or implicitly as the input to a digital device. The digitized form of said conditioned input signal or waveform is then received by a computing engine 22 such as a personal computer (PC) processor, microprocessor, programmable logic device, or custom-built electronic circuit. The computing engine 22 also receives a time base signal (clock) from a high-frequency master clock oscillator 23 such as a quartz crystal. The computing engine 22 typically also receives data from one or more manual user devices 24 such as switches, encoders, and so on to allow the user to control the device or change quasi-static parameters such as tuning offsets.

In response to all of its inputs, computing engine 22 provides appropriate signals to a multiple display element (e.g., pixel) visual display 25, which is preferably an electronically controlled display with a two-dimensional screen, such as a Cathode Ray Tube (CRT) or Liquid Crystal Display (LCD), for example, to update the display of quasi-static parameters (note name, offsets, etc.) and, in particular, to effect the displacement or movement of image objects or patterns on said screen of visual display 25 as required by the present invention. More specifically, computing engine 22 continually computes an image displacement value based on the current reference frequency with the Master Clock Oscillator 23 as a time base. The displacement value represents the distance between an initial or reference position on the screen of the visual display 25 and a current position at which the image objects or patterns are to be located. This function would typically be executed with digital counter hardware and/or a software timer routine that continually interrupts normal execution flow to calculate and update said displacement value in a register or memory location. Concurrently, computing engine 22 analyzes the conditioned and digitized input signal or waveform to detect a unique phase or portion of the fundamental period segments of said signal or waveform, typically a portion corresponding to the original fundamental period peaks of the input signal or waveform. There are many methods and algorithms current in the art which implement this function, the details of which are understood by those of skill in the art and are not a subject of this invention. Upon detection of said phase or portion of each fundamental period segment, or upon detection of a selected number of said phases, computing engine 22 sends commands to visual display 25 to make visible one or a plurality of image objects or patterns at positions determined by the most recently calculated displacement value.

The method by which the invention works is as follows. Continually shift (or otherwise calculate a displacement of) one or a plurality of image objects in any chosen direction (up, say) by one or more pixel row positions (where a pixel is the smallest controllable visual element or area on a given visual display means) wherein the rate of displacement is determined by a currently selected or defined reference frequency (which is usually, but not limited to, a standard musical note frequency). More specifically, the time, $T_{shift}$, that would elapse between successive one-pixel displacements of an image object position may be set to:

$$T_{shift}=1/(N_{object\text{-}size}*F_{ref}) \quad (1)$$

where $N_{object\text{-}size}$ is the number of one-pixel sized image displacements required for an image object (one black and white rectangular bar pair say) to again reappear in its original position on the display screen (or in the position of an adjacent equivalent image object previously displayed on the display screen). In other words, $N_{object\text{-}size}$ is simply the pixel "height" of each image object. $F_{ref}$ is the frequency in cycles per second (Hertz) of said reference frequency. Actual calculation and display screen updating may occur at sub-multiples of this basic time rate (to conserve processing overhead) in conjunction with the deployment of any of various interpolation or approximation schemes to similarly achieve one-pixel resolution in the displacement calculation. These and other variations in a particular embodiment of the invention are within the intended scope of this invention.

In this implementation scenario, the displaced position of the image object(s) is not generally made visible to the eye except when "validated" at times determined by the conditioned and digitized input signal or waveform as described below. The method used to prevent visibility will depend on the specific visual display means chosen for a particular embodiment. Some examples are to image ALL pixels of the image object(s) as "dark" on a CRT display or to switch off the "back light" illumination behind a transmissive LCD display. Another method is to selectively update the display image only at valid times as described below. Any and all methods appropriate to whatever electronically controlled visual display means is chosen in a particular embodiment of the invention are within the intended scope of this invention.

At such times as when a unique phase or portion of a fundamental period segment (or possibly multiple period segments) of the external input waveform occurs and is detected, the image object(s)—displaced in position as dictated by equation (1)—is made visible by whatever method is appropriate for the chosen visual display means. For practical, continuous operation, it should be understood that the portions of the image object(s) that would have been shifted or displaced beyond the physical limits of the visual display means must be redrawn (wrapped back or circularly scrolled) into the portion of said visual display means that would otherwise have been left vacant by the current displaced position of the image object(s). The number, $N_{visible\text{-}shift}$, of one-pixel displacements between the positions of a given image object made visible using the above criterion will be equal to the integer number—that is, truncated (or rounded to achieve better accuracy)—of $T_{shift}$ intervals as calculated per equation (1) that constitute the time interval between each detection of said unique phase of successive fundamental period segments of the external input waveform:

$$N_{visible\text{-}shift}=INT(T_{input\text{-}period}/(T_{shift})) \quad (2)$$

where $T_{input\text{-}period}$ is the period of time comprising the "fundamental period" of the external input waveform. A more generalized equation:

$$N_{visibl\text{-}shift}=modulo(n*T_{input\text{-}period}/T_{shift}, L_{screen}) \quad (3)$$

where "n" is any positive integer and $L_{screen}$ is the length in pixels of the display screen in the dimension of image object displacement, allows for the possibility that some integer number, n, of fundamental period segments in the external input waveform may be skipped or ignored and that visible displacements of greater than the length of the display screen, $L_{screen}$, are equivalent in effect to displacements equal to the remainder of the total calculated displacement divided by the display screen length.

The application of equation (3)—the more general form of equation (2)—is utilized in the first preferred embodiment of the present invention. The simpler form, equation (2), will be applied in the explanation below to more clearly describe operation of the present invention. If the "fundamental frequency" of the external input waveform exactly matches the reference frequency, $F_{ref}$, then $T_{input\text{-}period}$ is simply equal to $1/F_{ref}$ and substitution using equations (1) and (2) yields:

$$N_{visible\text{-}shift}=(1/F_{ref})/(1/(N_{object\text{-}size}*F_{ref})) \quad (4)$$

$$N_{visible\text{-}shift}=N_{object\text{-}size} \quad (5)$$

In other words, in this case, the displacement in pixels between successive visible positions of the image pattern on the visual display means would be equal to the image object "height" itself. Consequently, the image object(s) within the image pattern will appear to not have been moved at all. That is, the succession of image objects that constitute a "band" in the image pattern—column 14 in FIG. 1, for example—will have been displaced and/or wrapped back into the display screen in such a way that all newly visible image objects will replace previously drawn visible image objects exactly. This is precisely the desired effect when the frequency of the input waveform matches the reference frequency.

Alternatively, if the frequency of the input waveform is smaller (longer time period) than the reference frequency, $N_{visible\text{-}shift}$ will be greater than $N_{object\text{-}size}$ and the result will be that the image object(s) will appear to be progressively displaced by one or more pixel positions in one direction with each detection of said unique phase of successive fundamental period segments in the external input waveform. The rate of displacement will be directly proportional to the discrepancy between said frequency of the input waveform and the reference frequency. The same effect will occur when the frequency of the input waveform is larger than the reference frequency except that the visible displacement of the image object(s) will appear to be in the opposite direction from the previous case. Thus, a comprehensive means of visually identifying the relative discrepancy (sign and magnitude) between the frequency of an input waveform and a reference frequency is provided by the present invention.

Figure 3:
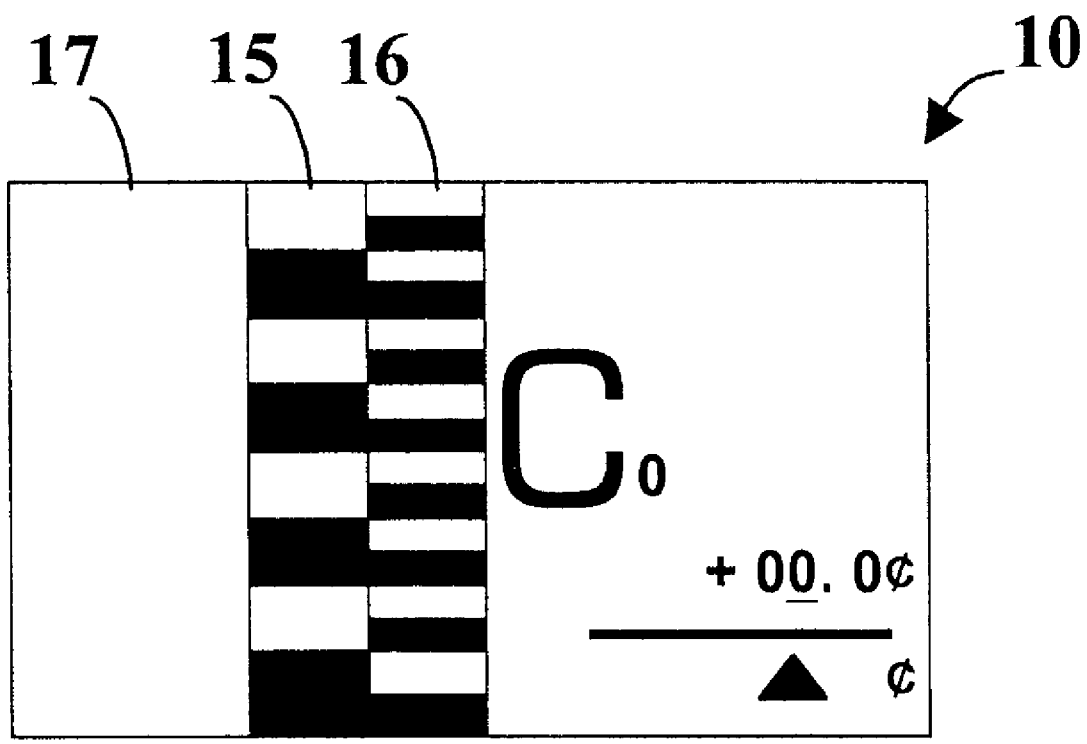
FIG. 3 is an illustration of a typical display screen configuration utilized in an embodiment of the present invention in which two columns of image objects normally visible as in FIG. 1 have been rendered temporarily invisible.

The invention may also include the following features. To ease visibility, a plurality of image objects (repetition of a dark/light rectangular bar object say), may be juxtaposed along the direction of image object displacement on the visual display means at any one time and shifted (or redrawn in a displaced position) together as in column 15 in FIG. 1 for example. Similarly, smaller image objects—as in column 16 of FIG. 1—may be drawn alongside said plurality of image objects. Said smaller image objects would allow visual inspection of the frequencies of external inputs at a higher octave frequency region without alteration of the reference frequency. In addition, co-existing large and small image objects extend the useful frequency range of external inputs for a given reference frequency range. A selective "blanking" (rendering invisible) of image objects or areas based on current user selections, the current reference frequency, or the "fundamental frequency" of the external input waveform may also be employed to minimize non-essential or otherwise confusing or distracting visual information as in, but not limited to, removing octave "bands" in the image pattern display area when not meaningful for a current external input waveform frequency octave. In FIG. 3, an exemplary display screen 10 is shown in which a subset of the original octave "bands"—columns 13 and 14 shown in FIG. 1—have been temporarily replaced by blank area 17 while octave bands 15 and 16 continue to provide useful information.

The embodiment of the present invention may be implemented in any of various forms. For instance, a unique electronic device including a visual display screen may be specifically constructed to implement the method of the present invention through specially coded software programming or firmware programming internal to the device. Alternatively, said method may be incorporated in a software program which may be executed alone or in conjunction with other programs for some period of time on any of various general-purpose electronic hardware devices including, but not limited to, networked computers, desktop (PC), notebook and handheld-sized electronic computers, wrist-worn and visor-integrated electronic computers wherein said hardware devices may include or otherwise connect with generic or specially constructed peripheral hardware devices to receive sound input, transfer data or programming to or from other devices or media, and so on.

Other ancillary features that may be employed with the invention include the following. The reference frequency can be manually selected through a user-input device along with means to offset said frequencies by customary cycles per second (Hertz) or "cents" variations. In addition, a means may be included to sufficiently quantify the "fundamental frequency" of the external input waveform so as to allow automatic selection of the reference frequency from any one of a plurality of standard or customized scales wherein said selection is the closest match within a given scale to the fundamental frequency of the external input waveform.

What is claimed is:

1. A method for manipulating visual image objects on a visual display for the purpose of visually demonstrating a difference between a first frequency and a second frequency, said visual display including a plurality of display elements, said method comprising the steps of:
   a) producing a set of one or more image objects composed of a plurality of said display elements on said visual display;
   b) repeatedly calculating a time-varying position on said visual display where said set of one or more image objects is to be displayed, said time-varying position being displaced along said at least one axis of said visual display at a rate that is proportional to said first frequency;
   c) detecting more than one occurrence of a unique portion of a fundamental period segment from among a plurality of fundamental period segments in an input waveform, said input waveform having said second frequency to be compared to said first frequency; and
   d) selectively rendering visible said set of one or more image objects on said visual display at a position derived from one or more calculations of said time-varying position at a time derived from when said unique portion of one or more of said plurality of fundamental period segments in said input waveform is detected, whereby, said set of one or more image objects appears to move across said visual display in a direction and at a rate that is dependent on a difference between said first and said second frequencies.

2. The method of claim 1 wherein said visual display is selected to be a two-dimensional, electronically controlled visual display, wherein visual contrast within or around said one or more image objects is accomplished through variations in visual parameters selected from the group consisting of emitted light intensity, reflected light intensity, emitted color, reflected color, or any combinations thereof.

3. The method of claim 1 wherein said set of one or more image objects comprises a band of multiple image objects that are identical in size along an axis of image object displacement and rendered adjacent to one another along an axis of image object displacement.

4. The method of claim 3 wherein said multiple image objects are dissimilar in at least one of color, shape, or pattern from one to another.

5. The method of claim 3 wherein an image on a portion of said visual display comprises multiple versions of said band of image objects wherein the bands are positioned adjacent to one another in a direction perpendicular to said axis of image object displacement.

6. The method of claim 5 wherein said multiple image objects are dissimilar in at least one of color, shape, or pattern from one band to another.

7. The method of claim 5 further comprising the step of rendering at least one of said bands temporarily invisible based upon at least one condition selected from the group consisting of a musical note, offset, or octave corresponding to said first frequency; a musical note, offset, or octave corresponding to said second frequency; and at least one parameter specified by user selection.

8. The method of claim 1 wherein said first frequency is selected to have a known reference frequency value, said known reference frequency value being selected by quantifying a fundamental frequency of said input waveform and selecting from among a finite set of values within a standard or customized scale a value from said scale that most closely matches said fundamental frequency of said input waveform.

9. The method of claim 1 wherein a plurality of said image objects are employed to form visual image patterns on said visual display, said patterns are consistently and continually updated with all calculated image object displacements, and the step of selectively rendering visible said set of one or more image objects is accomplished by control of intensity or color of a back light or other source light when said unique portion of one or more of said plurality of said fundamental period segments in said input waveform has been detected.

10. The method of claim 1 wherein said step of selectively rendering visible said set of one or more image objects is accomplished by updating a visual image pattern on a portion of said visual display only when said unique portion of one or more of said plurality of said fundamental period segments in said input waveform has been detected.

11. The method of claim 1 wherein at least one visual image pattern formed on a portion of said visual display by said set of one or more image objects is continually updated with a uniform intensity and/or color pixel field in said portion of said visual display whenever said unique portion of one or more of said plurality of fundamental period segments in said input waveform is not concurrently received and detected.

12. The method of claim 11 wherein at least one visual image pattern formed on a portion of said visual display by said set of one or more image objects is continually updated by displacing said at least one pattern along said at least one axis of said display at a rate proportional to said first frequency only when said unique portion of one or more of said plurality of said fundamental period segments in said input waveform has been detected.

13. The method of claim 1 wherein each of said display elements comprises a pixel, and a calculated time, $T_{shift}$, between single pixel displacements of an image object position for a given said first frequency is:

$$T_{shift} = 1/(N_{object-size} * F_{ref})$$

where $N_{object-size}$ is the maximum number of pixels constituting the span of the image object along the axis of image object displacement and $F_{ref}$ is said first frequency in cycles per second.

14. An apparatus for visually demonstrating a difference between a first frequency and a second frequency comprising:
   a) a visual display, said display including a plurality of display elements defining at least one axis; and
   b) a computing engine for driving said visual display, said computing engine including means for:
      1) calculating a time-varying position on said visual display where a set of one or more image objects is to be displayed, said time-varying position being displaced along said at least one axis of said display at a rate that is proportional to a frequency of said first signal;
      2) detecting more than one occurrence of a unique portion of a fundamental period segment from among a plurality of fundamental period segments in an input waveform, said input waveform having said second frequency to be compared to said first frequency; and
      3) selectively rendering visible said set of one or more image objects on said visual display at a position derived from one or more calculations of said time-varying position at a time derived from when said unique position of one or more of said plurality of fundamental period segments in said input waveform is detected, whereby, said set of one or more image objects appears to move across said visual display in a direction and at a rate that is dependent on a difference between said first and said second frequencies.

15. The apparatus of claim 14 wherein said visual display is a two-dimensional, electronically controlled visual display, wherein visual contrast within or around said one or more image objects is accomplished through variations in visual parameters selected from the group consisting of emitted light intensity, reflected light intensity, emitted color, reflected color, or any combinations thereof.

16. The apparatus of claim 14, further comprising at least one input for receiving an external signal that is employed to supply said second frequency.

17. The apparatus of claim 16 wherein said at least one input includes an acoustic signal detection device for detecting an acoustic sound and generating an electrical signal in response thereto.

18. The apparatus of claim 16, further comprising means for digitizing said external signal and entering a digitized version of said external signal into said computing engine for use as said second frequency.

19. The apparatus of claim 14, wherein said first frequency is a reference value, and said apparatus further comprises means for selecting said reference value by quantifying a fundamental frequency of said second frequency and selecting from among a finite set of values within a standard or customized scale a value from said scale that most closely matches said fundamental frequency of said second frequency.

20. The apparatus of claim 14 wherein a plurality of said image objects are employed to form visual image patterns on said visual display means, and said computing engine further includes means for consistently and continually updating said patterns with all calculated image object displacements, and selectively rendering visible said image objects by control of intensity or color of a source light in said display when said unique portion of one or more of said plurality of said fundamental period segments in said input waveform has been detected.

21. The apparatus of claim 14 wherein said computing engine further includes means for selectively rendering visible said set of one or more image objects by updating a visual image pattern on a portion of said visual display only when said unique portion of one or more of said plurality of said fundamental period segments in said input waveform has been detected by said computing engine.

22. The apparatus of claim 14 wherein said computing engine further includes means for continually updating at least one visual image pattern formed on a portion of said visual display by said set of one or more image objects with a uniform intensity and/or color pixel field in said portion of said visual display whenever said unique portion of one or more of said plurality of fundamental period segments in said input waveform is not concurrently received and detected by said computing engine.

23. The apparatus of claim 22 wherein said computing engine further includes means for continually updating at least one visual image pattern formed on a portion of said visual display by said set of one or more image objects by displacing said at least one pattern along said at least one axis of said display at a rate proportional to said first frequency only when said unique portion of one or more of said plurality of said fundamental period segments in said input waveform has been detected by said computing engine.

24. The apparatus of claim 14 wherein each of said display elements comprises a pixel, and said computing engine further includes means for calculating a calculated time, $T_{shift}$, between single pixel displacements of an image object position for a given said first frequency, wherein:

$$T_{shift} = 1/(N_{object-size} * F_{ref})$$

where $N_{object-size}$ is the maximum number of pixels constituting the span of the image object along the axis of image object displacement and $F_{ref}$ is said first frequency in cycles per second.

25. The apparatus of claim 14, wherein said computing engine is selected from the group comprising a personal computer processor, microprocessor, programmable logic device, or custom-built electronic circuit.

* * * * *